(12) United States Patent
Bruce et al.

(10) Patent No.: US 6,703,331 B1
(45) Date of Patent: Mar. 9, 2004

(54) FUNGUS RESISTANT GYPSUM-BASED SUBSTRATE

(75) Inventors: Robert B. Bruce, Burlington (CA); David M. Harriss, Chesterfield, VA (US)

(73) Assignees: E. I. du Pont de Nemours and Company, Wilmington, DE (US); Innogyps, Inc., Burlington (CA)

(*) Notice: Subject to any disclaimer, the term of this patent is extended or adjusted under 35 U.S.C. 154(b) by 214 days.

(21) Appl. No.: 09/513,097

(22) Filed: Feb. 25, 2000

Related U.S. Application Data

(60) Provisional application No. 60/121,697, filed on Feb. 25, 1999, and provisional application No. 60/121,698, filed on Feb. 25, 1999.

(51) Int. Cl.[7] .......................... B32B 13/02; B32B 13/14; B32B 13/10; B32B 13/00; B27K 1/00; B27K 3/00; B27K 5/00; E04B 1/62; E04C 2/54

(52) U.S. Cl. .................. 442/386; 428/294.7; 428/703; 52/517; 52/783.1

(58) Field of Search .................. 428/294.7, 703; 52/517, 783.1; 442/386

(56) References Cited

U.S. PATENT DOCUMENTS

| | | | |
|---|---|---|---|
| 4,327,146 A | 4/1982 | White | 428/308.8 |
| 4,378,405 A | 3/1983 | Pilgrim | 428/322.7 |
| 5,552,187 A | 9/1996 | Green et al. | 427/389.8 |
| 5,688,468 A | 11/1997 | Lu | 264/555 |
| 5,702,828 A | * 12/1997 | Adler et al. | 428/540 |
| 5,704,179 A | 1/1998 | Lehnert et al. | 52/408 |
| 5,879,486 A | 3/1999 | Philips et al. | 156/39 |
| 5,981,406 A | * 11/1999 | Randall | 442/71 |

FOREIGN PATENT DOCUMENTS

| | | | |
|---|---|---|---|
| CA | 1 189 434 | 6/1985 | .......... B32B/13/12 |
| JP | 49-112920 | 10/1974 | |
| JP | 53-73216 | 6/1978 | .......... B28B/1/16 |
| JP | 53-115516 | 10/1978 | .......... E04B/1/86 |
| JP | S54-24421 | 2/1979 | |
| JP | 8-300550 | 11/1996 | .......... B32B/13/14 |
| JP | 10-235822 | 9/1998 | |

* cited by examiner

*Primary Examiner*—Elizabeth M. Cole
*Assistant Examiner*—Jeremy R. Pierce

(57) ABSTRACT

The present invention relates to a fungus resistant gypsum board, made of first and second polymeric fibrous sheets with a gypsum core sandwiched there between. The gypsum core containing less than 0.03% of formulation additives that serve as fungus nutrients and less than 0.5% of the dry gypsum core contains of fungus nutrients. The fibrous sheets are preferably nonwovens and the gypsum core preferably contains a fungicide. The invention is also directed to a process for making a fungus resistant gypsum board.

20 Claims, 2 Drawing Sheets

FUNGUS RESISTANT GYPSUM-BASED SUBSTRATE

This application claims benefit of priority from Provisional Application No. 60/121,697 filed on Feb. 25, 1999, and from Provisional Application No. 60/121,698 filed on Feb. 25, 1999.

BACKGROUND OF THE INVENTION

1. Field of the Invention

This invention relates to gypsum-based construction materials. More particularly, the invention relates to a fungus resistant gypsum-based substrate faced with a synthetic polymeric sheet material that is suited for use as a construction material such as wallboard or ceiling panels. The invention is also directed to a process for manufacturing a fungus resistant gypsum-based substrate faced with a synthetic polymeric sheet material.

2. Description of Related Art

Fungi frequently can be found in the walls of buildings. Common fungi include mold and mildew. Fungi are especially troublesome in walls with poor ventilation where moisture can become trapped in the wall. The walls of portable buildings, such as temporary classrooms, have proved particularly susceptible to fungus growth because water often seeps in around the openings and joints of such structures. In buildings with poor ventilation or inefficient heating and air conditioning systems, the building walls are more likely to become breeding grounds for fungus. Some funguses that grow in walls, such as the stachybotrys chartarum (atra) fungus, produce toxins that have been known to render structures uninhabitable.

Conventional gypsum-based construction materials have the disadvantage that they support fungus growth when used in moist environments. Fungus needs both moisture and nutrients to survive. Naturally occurring organic matter that is a part of conventional gypsum board products, such as cellulose, paper fibers, starch, and contaminants, serve as nourishment for many strains of fungus. Accordingly, when conventional gypsum board becomes chronically moist or water damaged due to excessive humidity, water leaks, condensation, or flooding, fungus will grow on or in the gypsum board. Fungus growth can be exacerbated in gypsum board walls when vinyl wall coverings are used on the interior surface of the walls. Such vinyl wall coverings can trap moisture inside the gypsum board where it facilitates fungus growth.

Gypsum wallboard and gypsum panels are traditionally manufactured by a continuous process. In this process, a gypsum slurry is first generated in a mechanical mixer by mixing calcium sulphate hemihydrate (also known as calcined gypsum), water, and other agents. The gypsum slurry is normally deposited on a paper sheet. The gypsum slurry may include additives such as cellulose fibers that help to strengthen the gypsum core once it is dry. Starch is conventionally added to the gypsum slurry in order to improve the adhesion between the gypsum core and the paper facing. An upper continuously advancing paper sheet is laid over the gypsum and the edges of the upper and lower paper sheets are pasted to each other with a starch paste. The paper sheets and gypsum slurry are passed between parallel upper and lower forming plates or rolls in order to generate an integrated and continuous flat strip of unset gypsum sandwiched between the paper sheets that are known as facing or liners. This strip is conveyed over a series of continuous moving belts and rollers for a period of 2 to 5 minutes during which time the core begins to hydrate back to gypsum and hardens. During each transfer between belts and/or rolls, the strip is stressed in a way that can cause the paper facing to delaminate from the gypsum core if the adhesion between the gypsum core and the facing is not sufficient. Once the gypsum core has set sufficiently, the continuous strip is cut into shorter lengths or even individual boards or panels of prescribed length. Once again, it is important for there to be good adhesion between the paper sheets and the set, but still wet, gypsum core or the cutting action will pull the edges of the paper facing sheet away from the gypsum core.

After the cutting step, the gypsum boards are separated and grouped through a series of belts and rollers and then flipped over before being fed into drying ovens or kilns where the boards are dried so as to evaporate excess water. The hydration from hemihydrate to gypsum must be essentially complete at this point, normally between 7 and 15 minutes after mixing. When the gypsum boards are accelerated, flipped and fed into the drying ovens, the boards are subjected to a variety of stresses that can cause the facing to peel away from the gypsum core of the boards unless there is good adhesion between the set (but still wet) gypsum core and the facing material. Inside the drying ovens, the boards are blown with hot drying air at speeds up to 4000 feet/minute which can cause further delamination of the paper facing if there is not good wet adhesion between the gypsum and the paper liners. When portions of the facing sheets delaminate from the gypsum core during drying in the oven, the liner becomes entangled in the rollers and the gypsum crumbles as it dries which jams the oven and requires frequent shut downs of the line while the loose gypsum is cleaned out of the ovens. The gypsum boards are dried in the ovens for anywhere from 30 to 75 minutes. After the dried gypsum boards are removed from the ovens, the ends of the boards are trimmed off and the boards are cut to desired sizes.

The fully dried gypsum adheres well to the paper facing sheet materials as long as the gypsum board is kept dry. However, paper facing has a number of inherent properties that can be detrimental in a gypsum wallboard product. As discussed above, paper facing material (sometimes called a paper liner) is made of cellulose which serves as a nutrient for fungus growth. Paper facing also is not as strong or abrasion resistant as needed for certain construction applications. In addition, because the strength of paper differs significantly depending on the direction in which the strength is measured, paper facing must be relatively thick in order to achieve satisfactory multidirectional strength. Paper faced gypsum-board products also suffer from a lack of abrasion resistance. Paper facing used on conventional gypsum board becomes especially weak and subject to delamination from the gypsum core when the paper becomes damp due to leaks or high humidity.

Paper-faced gypsum boards must generally be coated with another material, such as paint or a wallcovering material, in order to achieve sufficient abrasion resistance. For example, paper-faced wallboard is often covered with vinyl wallcovering, a hard plastic sheet, or a plastic film when used in high traffic areas. Unfortunately, such coatings and coverings tend to trap moisture inside the wall where it can precipitate fungus growth.

Canadian Patent No. 1,189,434 discloses gypsum panels made with a facing of a moisture vapor permeable spunbonded nonwoven material. Canadian Patent No. 1,189,434 discloses gypsum panels faced with Tyvek® spunbonded olefin sheet material. Tyvek® is a registered trademark of E.I. du Pont de Nemours and Company of Wilmington, Del.

Tyvek® sheets are made by solution flash-spinning polyethylene to form fine plexifilamentary fibril structures that can be thermally bonded to form sheet material. U.S. Pat. No. 5,704,179 discloses gypsum board faced with mats of fiberglass or synthetic resin fibers. While the panels disclosed in these patents eliminate naturally occurring organic matter from the facing sheets of the gypsum board, these patents are not directed to reducing or eliminating fungus growth. Accordingly, the patents do not disclose removal of nutrients from the gypsum core or other enhancements needed to reduce fungus growth in the gypsum board.

In addition, while it has been possible to produce gypsum boards faced with polymeric fibrous sheet materials on a small laboratory scale, it has proven difficult to produce gypsum boards faced with such sheets on a commercial scale. This is because the adhesive strength between conventional fibrous synthetic fibrous sheets and the wet gypsum core (known as wet adhesion) tends to be low. Thus, the facing peels away from the gypsum core during various points in the production process before the boards are fully dried in the drying ovens.

There is a need for a process by which gypsum board that is free of fungus nutrients such as cellulose, starch, and natural fibers that can be manufactured on a commercial basis. There is also a need for a gypsum board that does not trap mold supporting moisture. Finally, there is a need for gypsum boards that actually include substances that prevent the growth of fungus.

BRIEF SUMMARY OF THE INVENTION

The present invention is directed to a fungus resistant gypsum board, comprising: a first polymeric fibrous sheet, the first sheet having a first surface and opposite first and second edges; a second polymeric fibrous sheet, the second sheet having a first surface and opposite first and second edges; a gypsum core sandwiched between the first and second nonwoven sheets, the gypsum core containing less than 0.03% by weight, based on the weight of the dry gypsum core, of formulation additives that serve as fungus nutrients; and a synthetic adhesive on the first and second edges of said second sheets, the synthetic adhesive adhering the first edge of said first nonwoven sheet to the first edge of the second nonwoven sheet, and adhering the second edge of the first nonwoven sheet to the second edge of the second nonwoven sheet. Preferably, the gypsum core contains less than 0.5% by weight, based on the weight of the dry gypsum core, of fungus nutrients.

According to a preferred embodiment of the invention, the gypsum core contains a fungicide such as a metal/inorganic derivative. More preferably, the fungicide is boric acid, and the gypsum core is comprised of between 0.04 and 0.25 weight percent, based on the weight of the dry gypsum core, of boric acid.

According to a preferred embodiment of the invention, the first and second polymeric fibrous sheets are nonwoven sheet. In the preferred embodiment of the invention, the first surface of the first nonwoven sheet and the first surface of the second nonwoven sheet adhere to said wet gypsum core with an adhesive strength of at least 7.5 lb. The first surface of the first nonwoven sheet and the first surface of the second nonwoven sheet have pores containing set gypsum of the gypsum core intertwined with the fibers in the first and second nonwoven sheets. The sheets may be comprised of a needle punched staple fiber sheet, a hydroentangled fibrous sheet, or a spunbond sheet. Alternatively, the first surface of the first and second nonwoven sheets may be coated with a primer layer of a high density gypsum slurry having a density that is at least 1.1 times the density of the gypsum core. Preferably, the first and second sheets adhere to said wet gypsum core with an adhesive strength of at least 10 lb.

The present invention is also directed to a process for manufacturing a gypsum-based substrate. The process includes the steps of: adding calcined gypsum, formulation additives and water to a mixer, the mixture containing less than 0.02% by weight, based on the weight of the total slurry mix, of formulation additives that serve as fungus nutrients; mixing the gypsum and water in the mixer to produce a gypsum slurry that is comprised of 50 to 65 weight percent gypsum; providing a first polymeric fibrous sheet, the first sheet having a first surface and opposite first and second edges; pouring the gypsum slurry from the mixer onto the first surface of the first sheet and spreading the gypsum slurry over the first surface of the first sheet; providing a second polymeric fibrous sheet, the second sheet having a first surface and opposite first and second edges; applying a synthetic adhesive on the first and second edges of the second sheet; placing the first surface of the second sheet over the gypsum slurry that has been spread over the first surface of the first sheet; adhering the adhesive on the first edge of the second sheet to the first edge of the first sheet, and adhering the adhesive on the second edge of the second sheet to the second edge of the first sheet; enclosing the gypsum slurry between the first and second sheets to bring the slurry into intimate contact with the first and second sheets and form an elongated strip of gypsum slurry sandwiched between the first and second sheets; allowing the elongated strip of gypsum slurry to set up and harden to form a stiff elongated strip having a solid, wet gypsum core sandwiched between the first and second sheets; cutting the stiff elongated strip into gypsum board of desired length; drying the gypsum board in a dryer to remove excess water from the gypsum boards.

In the process of the invention, the gypsum slurry contains less than 0.33% by weight, based on the weight of the total slurry, of fungus nutrients. After the elongated strip of gypsum slurry has set up and hardened to form a stiff elongated strip having a solid, wet gypsum core sandwiched between the first and second sheets, the first and second sheets preferably adhere to the wet gypsum core with and adhesive strength of at least 7.5 lb. According to the more preferred process of the invention, the first and second sheets are nonwoven sheets. It is preferred that the first surface of the first nonwoven sheet and the first surface of the second nonwoven sheet have open pores between fibers of sufficient size for the gypsum slurry to enter the pores and become intertwined with the fibers in the sheets when the gypsum slurry is enclosed between the first and second nonwoven sheets. It is desirable that the first and second sheets each have a mean flow pore size, measured according to ASTM F316-86, of at least 8.0 microns, and more preferably in the range of 8.7 to 40 microns.

BRIEF DESCRIPTION OF THE DRAWING(S)

The accompanying drawings, which are incorporated in and constitute a part of this specification, illustrate the presently preferred embodiments of the invention and, together with the description, serve to explain the principles of the invention.

DEFINITIONS

Figure 1:
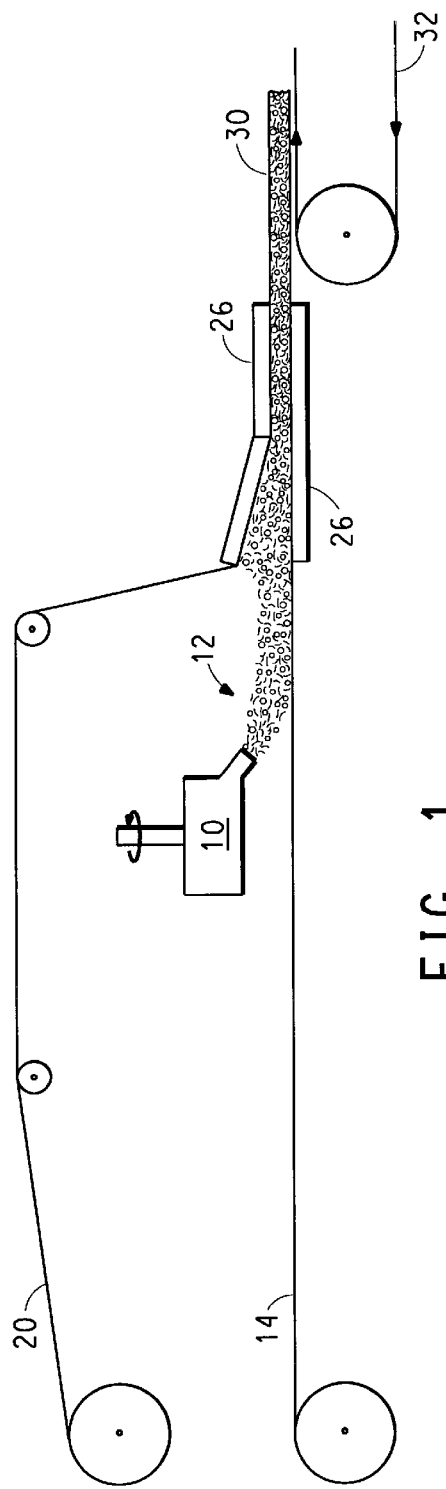
FIG. 1 is a schematic representation of a portion of the process of the invention.

As used herein, "fungus nutrients" means carbohydrate or cellulosic based materials, or other organic materials which are biodegradable by fungi commonly found in building construction materials.

As used herein, "fungicide" means a group of materials that destroy fungi or inhibits the growth of fungi. Fungicides include synthetic compounds that are sulfur containing, halogens containing, metal containing, aliphatic, aromatic (phenol compounds and deriviatives), naphthol, quinoline, and imidazole derivatives.

As used herein, "formulation additives that serve as fungus nutrients" means raw materials that are used to manufacture gypsum board and become incorporated into a final gypsum board product which materials fall within the definition of "fungus nutrients."

TEST METHODS

In the description above and in the non-limiting examples that follow, the following test methods were employed to determine various reported characteristics and properties. ASTM refers to the American Society for Testing and Materials.

Mold Resistance of wallboard samples was measured according to ASTM D3273 using 3.75 inch by 4 inch (9.5 cm by 10.2 cm) wallboard samples, prepared as described in Example 1 below. The wallboard samples were tested in triplicate by suspending the samples above a mold-soil inoculum in an environmental humidity chamber equipped with a fan to circulate the mold spores, constructed as detailed in ASTM D3273. A white pine control was also tested, as described in ASTM D3273. The soil inoculum for the study was prepared by seeding the incubating soil with three strains of fungi: *Aureobasidium pullulans* (ATCC 9348), *Aspergillus niger* (ATCC 6275), *Penicillium Sp.* (ATCC 9849). ATCC refers to the American Type Culture Collection, 12301 Parklawn Drive, Rockville, Ma. 20852The inside of the chamber was maintained at between about 90% to 100% relative humidity and a temperature of 88° F.–92° F. (31° C.–33° C.). The test samples were continuously equilibrated and challenged with mold for 4.5 weeks, during which time the samples were rated each week on a scale of 0 to 10 using photographic standards (ASTM D3274). A rating of 10 indicates undetectable mold growth and a rating of 0 indicates substantial mold growth. Any sample ratings that differed by more than an increment of 2 from the others for a particular example were disregarded and the average of the ratings was calculated based on the remaining data points.

At the conclusion of the study, the gypsum board samples were removed and microscopically examined at a magnification of 50× to distinguish mold growth from any soil particles that may have contaminated the board during the test. To further differentiate mold from soil particles, chlorine bleach was applied to the spots in question. Black spots disappearing on contact with the bleach were considered to be mold whereas spots which were unaffected by the bleach solution were considered to be soil particles. After microscopic examination and treatment with bleach, the boards were rated again on a scale of 0 to 10 using photographic standards (ASTM D3274). Any sample ratings that differed by more than an increment of 2 from the others for a particular example were disregarded and the average of the ratings was calculated based on the remaining data points and reported in Table 1 as the final rating.

Wet Adhesion was measured using an Instron tensile tester according to the following procedure.

Gypsum boards were prepared using a mold comprising a laminated board having three aluminum rails of ½ inch height (12.7 mm) screwed thereto to define three sides of a rectangular mold with one open end. The aluminum rails were sized to form a mold having a length of about 20 inches (50.8 cm) and a width of 3.75 inches (9.53 cm). With one of the longer side rails removed, a nonwoven sheet having a length of 19 inches (48.3 cm) and a width of 5.5 inches (14.0 cm) was placed on the bottom of the mold to act as a liner on the first side of the gypsum board. After re-screwing the 20 inch (50.8 cm) rail to the bottom of the mold, 1.75 inches (4.44 cm) of the 5.5 inch (14.0 cm) liner width extended outside of the mold, underneath the aluminum rail. The portion of the liner extending outside the mold forms an overhanging portion of the liner on the final gypsum board, which is inserted into the clamp of the Instron testing machine during wet adhesion testing. Immediately after mixing, as described in the examples below, a gypsum slurry was poured into the mold onto the nonwoven liner and spread evenly over the surface thereof. A second piece of nonwoven sheet material having dimensions of about 20 inches (50.8 cm) by 3.75 inches (9.53 cm) was placed on top of the gypsum slurry to act as a liner on the second side of the gypsum board. The board was allowed to sit at room temperature for 20 minutes to allow the gypsum to set. The temperature of representative mixes were monitored to ensure that the hydration was complete within this time frame (the temperature of the mix rises during hydration, then holds steady, and finally drops once hydration was complete). Hydration times of 16 to 18 minutes were recorded for the boards produced in the examples below. The boards were removed by unscrewing and removing the side rail which was on top of the overhanging section of liner and sliding each board out of the mold. The boards were flipped over so that the first side having the overhanging liner was on the top surface.

Immediately after the gypsum had set, each board was cut, using a utility knife, into three, four or five 3 inch (7.6 cm) by 3.75 inch (9.53 cm) sections (with the top liner having dimensions of 3 inches (7.6 cm) by 5.5 inches (14 cm) due to the overhang). The top nonwoven liner on each board section was cut parallel to the 3.75 inch (9.53 cm) side into three 1 inch (2.54 cm) wide strips and each strip was cut in the perpendicular direction such that the length of the liner section to be pulled off the board was 2 inches (5.1 cm) (in addition to the 1.75 inch (4.45 cm) overhang). The time taken to cut the board and the liner strips was no more than about 10 minutes.

The board was clamped in the Instron machine and the center strip was pulled from each board section with the Instron set at 20 or 50 pounds force (89 or 222 Newtons). During testing, the liner strip was pulled from the board in the direction parallel to the length of the liner. The wet adhesion was measured as the force in pounds at which the 2 inch length of liner was completely pulled away from the board. Testing of all of the three to five samples was completed within 5 minutes of testing the first sample. The wet adhesion is reported as the average (+/− standard deviation) of the three to five samples tested for each board.

Basis weight was determined by ASTM D-3776, which is hereby incorporated by reference, and is reported in g/m$^2$.

Maximum, minimum, and mean flow pore sizes were measured for the nonwoven liners on a Coulter Porometer II according to ASTM F316-86 using Porofil wetting fluid, available from Coulter. The max pore size is an indicator of the diameter of the largest pore channels in the distribution of pore sizes supporting flow through the web. The mean flow pore size is an indicator of the mean pore channel diameter for the pores supporting the total flow. The minimum pore size is an indicator of the minimum pore channel diameter for the pores supporting the total flow through the web. Pore size calculations were made using a size factor of 0.64, a tortuosity factor of 1.00, and a sample thickness of 10 microns.

DETAILED DESCRIPTION OF THE INVENTION

Reference will now be made in detail to the presently preferred embodiments of the invention, examples of which are illustrated below. The present invention is directed to a gypsum board product that is resistant to the growth of fungus. The invention is also directed to an improved process for manufacturing gypsum board having a gypsum core lined with a synthetic nonwoven facing material without the addition or use of materials or additives that may serve as fungus nutrients.

As discussed in the background section above, gypsum wallboard is traditionally manufactured by a continuous process. A commercial process for manufacturing the fungus resistant gypsum board material of the invention is shown in FIG. 1. As shown in FIG. 1, a gypsum slurry is first generated in a mechanical mixer 10 by mixing calcium sulphate hemihydrate (also known as calcined gypsum), water, water reducing agents, foam, bonding agents, and set control agents. The foam is a mixture of water, a foaming agent such as alkyl sulfate/alkyl ether sulfate mixtures, and air. Other additives, such as anti-burning agents, can be added to the slurry as needed. Formulation additives that serve as fungus nutrients, such as cellulose fibers or starch, preferably comprise less than 0.02% of the gypsum slurry, which corresponds to less than 0.03% by weight of the dried gypsum core. More preferably, there are no formulation additives that are fungus nutrients. In addition, the gypsum used in the slurry is preferably comprised of less than 0.5%, by weight of the dry gypsum core, which corresponds to less than 0.33% by weight of the wet gypsum core, of naturally occurring organic contaminants (such as plant or animal matter) that may serve as a fungus nutrient. According to a preferred embodiment of the invention, the gypsum slurry includes a fungicide such as a metal/inorganic derivative. More preferably, the gypsum slurry includes between 0.025% and 0.17% by weight boric acid, based on the total weight of the gypsum slurry.

Figure 2:
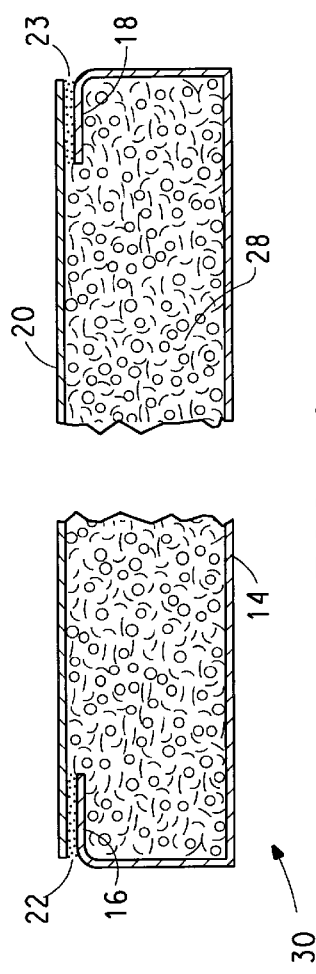
FIG. 2 is a cross-sectional view of a gypsum-based substrate made according to the invention.
Figure 3:
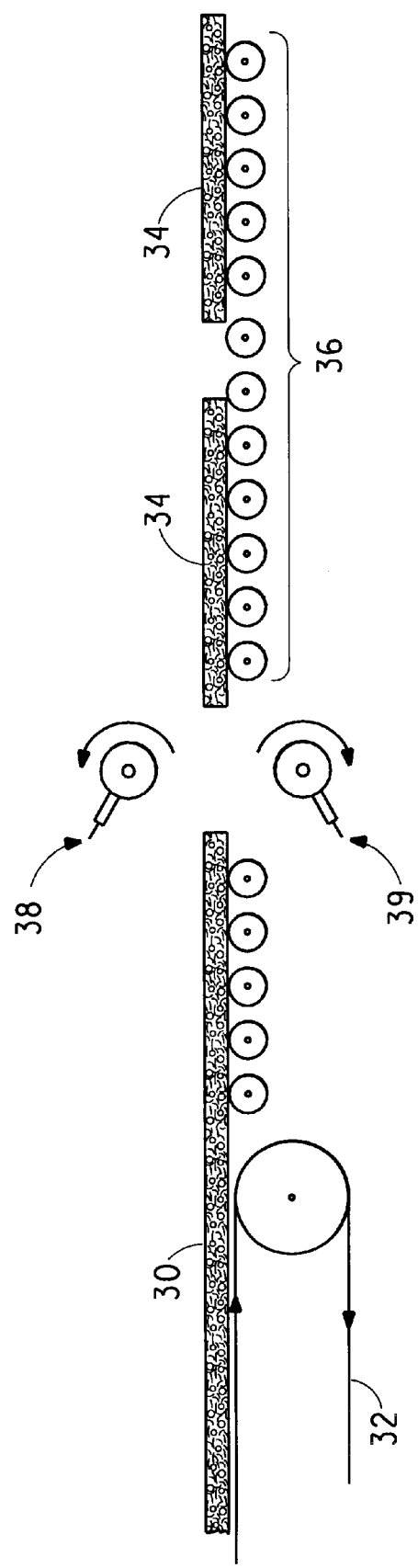
FIG. 3 is a schematic representation of another portion of the process shown in FIG. 1.

The gypsum slurry 12 is deposited on the central portion of a continuously advancing first polymeric fibrous sheet 14. The edges of the first sheet 14 are folded upward. As can be seen in the cross-sectional view of FIG. 2, each of the ends of the upturned edges of the sheet 14 are folded toward each other along folds a short distance, depending on the thickness of the board, from each of the first folds so as to form strips 16 and 18 that are substantially parallel to the bottom of the sheet. An upper continuously advancing second polymeric fibrous sheet 20, with a an adhesive applied on opposite edges of its bottom surface as adhesive strips 22 and 23, is laid over the gypsum slurry such that the edge paste strips 22 and 23 contact the folded over strips 16 and 18 of the first sheet 14. According to the invention the adhesive is material, such as a synthetic pressure sensitive polymeric adhesive that does not act as a fungus nutrient. Preferably, the adhesive strips 22 and 23 are comprised of fast tacking polyvinyl alcohol based adhesives, synthetic resin based adhesives, or hot melt adhesives. The polymeric fibrous sheets 14 and 20 may be woven or nonwoven synthetic sheets. Nonwoven sheets made of fiber forming thermoplastic polymers are preferred.

As can be seen in FIG. 1, the first and second nonwoven sheets and gypsum slurry are passed between parallel upper and lower forming plates 26 or rolls in order to generate an integrated and continuous flat strip 30 of unset gypsum sandwiched between synthetic fibrous sheets which are referred to as synthetic facing or liners. The strip 30 is conveyed over a series of continuous moving belts 32 and rollers (not shown) for a period of 2 to 5 minutes during which time the gypsum core 28 sets up. It is important that a good bond be formed quickly between the wet gypsum and the fibrous sheets 14 and 20 because the strip 30 can move at speeds in excess of 500 ft/min over a distances of 1200–2000 feet, during which time the strip 30 is transferred between multiple belts and rollers. During each transfer between belts and/or rolls, the strip 30 is stressed in a way that can cause the synthetic facing to delaminate from the gypsum core 28 if the adhesion between the gypsum core and the facing is not sufficient. Once the gypsum has set, the continuous strip 30 is cut into shorter lengths or individual boards or panels 34 of prescribed length by means of the rotating serrated blades 38 and 39. Once again, it is important for there to be good adhesion between the synthetic fibrous sheets 14 and 16 and the set, but still wet, gypsum core 28. Otherwise the blades 38 and 39 pull the edges of the synthetic facing sheet 14 and 16 away from the gypsum core 28 as the blades rotate during the cutting process.

After the cutting step, the gypsum boards 34 are accelerated on rollers 36 to separate the boards from each other. The separated gypsum boards are then lifted from the line and flipped over by my means of a plurality of lifting arms. The boards are fed, with their top sides down, into drying ovens or kilns where the boards are dried so as to evaporate excess water. When the gypsum boards are accelerated, flipped and fed into the drying ovens, the boards are subjected to a variety of stresses that would cause the synthetic facing to peel away from the gypsum core of the boards but for the excellent wet adhesion between the set (but still wet) gypsum core and the facing material that is obtained by means of the process of the invention. Inside the drying ovens, the boards are blown with hot drying air at speeds up to 4000 feet/minute. The absence of loose edges where there is not good adhesion between the nonwoven synthetic sheets 14 and 16 and the wet gypsum core 28 means that the facing is not pulled away from the gypsum core by the hot drying air. The gypsum boards are dried in the ovens for anywhere from 30 to 75 minutes. After the dried gypsum boards are removed from the ovens, the ends of the boards are trimmed off and the boards are cut to desired sizes.

According to the invention, steps can be taken to improve the wet adhesion between the setting gypsum slurry and the synthetic fibrous sheet, that do not include the addition of fungus nutrients, such as starch, to the gypsum panels.

According to one preferred embodiment of the invention, wetting agents that do not act as fungus nutrients are added to the gypsum slurry or applied to the synthetic nonwoven sheet before the gypsum slurry and nonwoven liner are brought into contact with each other. Such agents include synthetic chemicals with hydrophilic and hydrophobic groups which are known to reduce surface tension of aqueous solutions and reduce contact angles with hydrophobic solids. A wide range of wetting agents will perform this function such as soaps and detergents, or even the foaming agents which are described above for adding foam to the gypsum core.

A preferred wetting agent is polyvinyl alcohol (PVA). While effective as a wetting agent, it can also be used to replace the starch that is normally used in a conventional gypsum board manufacturing process to improve the bonding of the liner to the dried gypsum core. Polyvinyl alcohol is commonly used as an adhesive and it has now been found that during the drying process, the polyvinyl alcohol will migrate to the interface between the liner and gypsum core and improve the bonding of the liner to the dried gypsum core to the extent that starch is not needed. Indeed, PVA has been found to be a more effective dry bond adhesive than the starch for synthetic fibrous polymeric liners. The starch, a fungus nutrient, can be replaced by PVA, a formulation additive that does not serve as a fungus nutrient.

According to another preferred embodiment of the invention, the first and second synthetic sheets each have a first surface characterized by pores or spaces formed between fibers, which pores are of sufficient size for a gypsum slurry to enter the pores and become intertwined with the fibers in the sheets so as to form a strong mechanical bond between the gypsum core and the fibrous synthetic sheets when the gypsum sets up. The gypsum slurry is deposited on this first porous surface of the first sheet and the first porous surface of the second sheet is juxtaposed against the gypsum such that when the gypsum slurry is enclosed between said first and second nonwoven sheets, the slurry impregnates into the pores or spaces between the fibers on the surfaces of the first and second fibrous sheets. According to this embodiment of the invention, a strong bond is formed between the wet gypsum core and the sheets in the absence of naturally occurring additives, such as starch, that can serve as fungus nutrients. Preferably, the first and second nonwoven sheets each have a mean flow pore size, measured according to ASTM F316-86, of at least 8.0 microns. According to a more preferred embodiment of the invention, the first and second nonwoven sheets each have a mean flow pore size, measured according to ASTM F316-86, in the range of 8.7 to 40 microns. This range of pore sizes allows the wet, set gypsum layer to intertwine with the fibers of the synthetic fibrous liner, providing good wet adhesion, without the gypsum slurry penetrating completely through the nonwoven liner.

According to the invention, the first and second sheets may be nonwoven sheets comprised of meltspun substantially continuous fibers, carded staple fiber webs, needle punched staple fiber webs, hydroentangled fibrous webs, or other porous nonwoven synthetic structures. The fibers in the first and second nonwoven sheets are comprised of synthetic melt spinnable polymer. The preferred fibers are comprised of one or more of any of a variety of polymers or copolymers including polyethylene, polypropylene, polyester, aramids, nylon, elastomer, and other melt spinnable polymers. For example, the fibers of the first and second nonwoven sheets may be comprised of at least 50% by weight polyester polymer, such as poly(ethylene terephthalate), poly(propylene terephthalate), or poly(butylene terephthalate) polymer. Alternatively, the fibers may be comprised of at least 50% by weight of a nylon polymer, a polyolefin polymer such as polyethylene or polypropylene, or an elastomeric polymer such as polyurethane or co-polyether ester.

According to one especially preferred embodiment of the invention, the first and second nonwoven sheets may be comprised of small denier polymeric fibers that, when made into a sheet structure, form numerous very small pores. The fibers of such sheet can be melt spun and air drawn according to the process disclosed in U.S. Pat. No. 5,688,468. Such nonwoven sheet may be a unitary fibrous sheet comprised of melt spun substantially continuous filament polymer fibers wherein the sheet has a basis weight of from 13 g/m$^2$ to 125 g/m and substantially all of the fibers are melt spun fibers. The fibers in such nonwoven sheets have a cross sectional area of between about 20 and about 90 $\mu m^2$, and more preferably, of from about 25 to about 70 $\mu m^2$, and most preferably from about 33 to about 60 $\mu m^2$. Such melt spun microfibers sheets have a tensile strength (in both the machine and cross directions), normalized for basis weight, of from 0.7 to 5 N/(g/m$^2$), and more preferably from 0.8 to 4 N/(g/m$^2$), and most preferably from 0.9 to 3 N/(g/m$^2$).

In another preferred embodiment of the invention, the surface of the synthetic nonwoven liner which contacts the gypsum slurry has a textured surface comprising depressions and/or protrusions. Such textured surfaces can be found in embossed woven and nonwoven fabrics (e.g. thermally point-bonded nonwoven fabrics) or embossed woven fabrics. The gypsum slurry flows into the depressions or around the protrusions on the textured surface and mechanically locks the gypsum layer to the liner as the gypsum layer expands during setting. Preferably the depressions or protrusions have dimensions in the range of about 50 to 2000 microns in the plane of the liner and from about 30 to 500 microns in depth with between 20 and 100 depressions/protrusions per square centimeter. More preferably, the dimension of the protrusions in the plane of the liner is between about 100 and 1000 microns, the depth of the protrusions is between about 200–500 microns, and there are between 30 and 75 depressions/protrusions per square centimeter. The dimensions of the protrusions/depressions can be measured by microscopic analysis using scanning electron microscopy techniques known in the art.

According to another preferred embodiment of the invention, the process of the invention may include the steps of coating the first surface of each of the first and second synthetic sheets with a thin coating of a dense gypsum slurry. Preferably, the first surface of said first sheet and said first surface of said second sheet are coated with a layer of a high density gypsum slurry having a density that is 1.1 to 3 times the density of the gypsum slurry used to form the core of the gypsum board. Preferably, the dense gypsum layer has a thickness in the range of 1/32 to 1/8 inch and has a dry density of between about 0.70 and 1.72 g/cc (corresponding to a wet density of between about 1.06 to about 1.98 g/cc). The gypsum slurry density may be calculated based on a density of water of 1 g/cc and a gypsum density of 2.32 g/cc or can be measured using methods known in the art. Typical commercial gypsum board core densities are approximately 0.96 g/cc (wet) and 0.63 g/cc (dry). Gypsum boards lined with a synthetic polymeric fibrous liner having a high density layer adjacent the liner can be produced using methods known in the art for paper liners. For example, the high density gypsum slurry may be coated onto a synthetic nonwoven liner using the roller-coating apparatus and method described in U.S. Pat. No. 5,879,486, which is hereby incorporated by reference. Alternately, a deforming agent can be applied to the surface of the synthetic polymeric nonwoven liner which results in an increase in the gypsum density immediately adjacent the liner, as described in U.S. Pat. No. 4,327,146, which is hereby incorporated by reference. In paper-faced gypsum boards, the paper has good wet adhesion to the gypsum slurry and the high density gypsum layer is used to improve the dry bond between the paper liner and the gypsum. In the current invention, the use of a high density gypsum layer results in improved wet adhesion between the synthetic fibrous liner and the gypsum slurry, allowing the board to be manufactured using conventional gypsum board manufacturing processes.

EXAMPLES

The following non-limiting examples are intended to illustrate the product and process of the invention and not to limit the invention in any manner.

Example 1

A gypsum slurry was prepared by pre-blending, in a plastic bag, 400 grams of General Purpose White Molding Plaster (available from USG Corporation), a beta-type hemihydrate plaster similar to that used in a commercial gypsum board factory, and 0.67 grams of a very finely ground gypsum accelerator having an average particle size of less than 2 microns. The pre-blended powder was then sifted over a period of approximately 2 minutes onto the surface of a polyvinyl alcohol (PVA) solution contained in a Waring blender, allowing the gypsum to wet out and fall to the bottom of the blender. The PVA solution comprised 305 ml of a stock solution prepared by dissolving 22.1 grams of Elvanol® 90-50 polyvinyl alcohol (available from E.I. du Pont de Nemours and Company) in 1000 ml of water, heating to dissolve the polyvinyl alcohol, and cooling the resulting solution at room temperature for at least 24 hours. Immediately after the addition of the pre-blended powder to the PVA solution was completed, foam that had been prepared by blending 65 ml of a 0.5 weight percent solids solution of an alkyl sulphate/alkyl ether sulphate blend (Cedepal FA-406, manufactured by Stepan Chemicals) in a separate Waring blender for approximately 2 minutes was poured on top of the water/solids mixture and the blender turned on for 10 seconds. The resulting gypsum slurry was used immediately for preparing the gypsum boards.

Half-inch thick gypsum boards were prepared by coating the gypsum slurry on a 3.75 inch by 16 inch (9.5 cm by 40.6 cm) sheet of Tyvek® 1058D flash-spun high density polyethylene (available from E.I. du Pont de Nemours and Company) placed on the bottom of a mold and covering the gypsum slurry with a second Tyvek®) 1058D sheet. Rubber gloves were worn throughout the board preparation process to avoid contamination of the liner surface with oils and dirt. After casting the board, it was removed from the mold, and dried in a General Signal Blue M Series forced air oven at 127° C. for 90 minutes, after which the oven temperature was ramped down to 75° C. over a period of 45 minutes. The oven was then turned off and allowed to cool to room temperature overnight. The dried gypsum board was removed from the oven and cut into four equal 4 inch×3.75 inch sections for mold testing. A 1/16 inch hole was drilled about 1/8 inch from one of the 3.75 inch edges, centered on the edge, used for suspending the boards in the environmental chamber during mold testing.

The boards were tested for resistance to mold growth as described above and the results are reported in Table 1 below. There was no evidence of delamination of the nonwoven liner during testing.

Boards were prepared for wet adhesion measurements and tested as described above. An average wet adhesion of 7.1±1.3 pounds-force (31.5±5.8 Newtons) was obtained.

Example 2

Gypsum boards were prepared as described in Example 1, except that 16.7 ml of Aqualite 70 wax emulsion (available from Monsey Bakor, Inc.) was added to the Waring Blender containing the 305 ml of PVA solution prior to adding the pre-blended gypsum powder.

The boards were tested for resistance to mold growth as described above and the results are reported in Table 1 below. There was no evidence of delamination of the nonwoven liner during testing.

Example 3

Gypsum boards were prepared as described in Example 1, except that the lining was a thermally point bonded spunbonded polypropylene fabric having a basis weight of 2.1 oz/yd2 containing 2 weight % pigment. The fibers had an effective diameter of about 10 microns. The gypsum board was prepared with the embossed sides of the liner facing the gypsum slurry.

The boards were tested for resistance to mold growth as described above and the results are reported in Table 1 below. There was no evidence of delamination of the nonwoven liner during testing.

Example 4

Gypsum boards were prepared as described in Example 1, except that the lining was a point bonded spunbonded polyester fabric having a basis weight of 1.9 oz/yd$^2$, and comprising fibers having an effective diameter of approximately 8.6 microns. The spunbonded liner was thermally point bonded between an engraved oil-heated metal calender roll and a smooth oil heated metal calender roll. The engraved roll had a chrome coated non-hardened steel surface with a diamond pattern having a point size of 0.466 mm$^2$, a point depth of 0.86 mm, a point spacing of 1.2 mm, and a bond area of 14.6%. The point bonded sheet had a minimum pore size of 14.69 microns, maximum pore size of 70.63 microns, and a mean flow pore size of 29.01 microns. The gypsum board was prepared with the embossed sides of the liner facing the gypsum slurry.

The boards were tested for resistance to mold growth as described above and the results are reported in Table 1 below. There was no evidence of delamination of the nonwoven liner during testing.

Boards were prepared for wet adhesion measurements and tested as described above. An average wet adhesion of 12.3±2.2 pounds-force (55±10 Newtons) was obtained.

Example 5

Gypsum boards were prepared as described in Example 1, except that the lining was Sontara® E88-320 spunlaced polyester having a basis weight of 4 oz/yd$^2$ (available from E.I. du Pont de Nemours and Company).

The boards were tested for resistance to mold growth as described above and the results are reported in Table 1 below. There was no evidence of delamination of the nonwoven liner during testing.

Boards were prepared for wet adhesion measurements and tested as described above. An average wet adhesion of 10.6±6.6 pounds-force (47.2±29 Newtons) was obtained.

Comparative Example A

In this example, a commercial paper-lined Sheetrock® gypsum board, manufactured by USG Corporation was tested for mold resistance.

The boards were tested for resistance to mold growth as described above and the results are reported in Table 1 below. The paper liner was observed to start to delaminate from the gypsum core during testing.

TABLE 1

Fungus Resistance Ratings for Gypsum Boards

| Example | Liner | Core Additives | ASTM Ratings | ASTM Average | Microscopic Ratings | Final Rating |
|---|---|---|---|---|---|---|
| 1 | Tyvek ® 1058D | PVA | 8, 8, 10 | 9 | 10, 10, 10 | 10 |
| 2 | Tyvek ® 1058D | PVA/Wax emulsion | 10, 8, 6 | 8 | 10, 10, 6 | 10 |
| 3 | Spunbond PP | PVA | 8, 10, 8 | 8 | 6, 10, 10 | 10 |
| 4 | Spunbond PE | PVA | 8, 8, 8 | 8 | 10, 10, 10 | 10 |
| 5 | Sontara ® E88-320 | PVA | 10, 8, 8 | 9 | 8, 10, 10 | 10 |
| Comp. A | Paper | Commercial Board | 2, 10, 4 | 3 | 2, 10, 4 | 3 |
| White Pine Control | — | — | 4 | 4 | 4 | 4 |

It can readily be seen that the gypsum boards made in accordance with the invention without the introduction of materials that serve as fungus nutrients are far more resistant to mold and fungus growth than is the conventional gypsum board of Comparative Example A. It will be apparent to those skilled in the art that modifications and variations can be made in process and gypsum board material of this invention. It is intended that all matter contained in the foregoing description, drawings and examples shall be interpreted as illustrative and not in a limiting sense.

What is claimed is:

1. A fungus resistant gypsum board, comprising:
   a first polymeric fibrous sheet, said first sheet having a first surface and opposite first and second edges;
   a second polymeric fibrous sheet, said second sheet having a first surface and opposite first and second edges;
   a gypsum core sandwiched between said first and second sheets, said gypsum core containing less than 0.03% by weight, based on the weight of the dry gypsum core, of formulation additives that serve as fungus nutrients; and
   a synthetic adhesive on the first and second edges of said second sheet, said synthetic adhesive adhering the first edge of said first sheet to said first edge of said second sheet, and adhering the second edge of said first sheet to the second edge of said second sheet.

2. The board of claim 1 wherein said gypsum core contains less than 0.5% by weight, based on the weight of the dry gypsum core, of naturally occurring contaminants which may serve as fungus nutrients.

3. The board of claim 1 wherein said gypsum core contains a fungicide.

4. The board of claim 3 wherein said fungicide is a metal/inorganic derivative.

5. The board of claim 4 wherein said fungicide is boric acid, and the gypsum core is comprised of between 0.04 and 0.25 weight percent, based on the weight of the dry gypsum core, of boric acid.

6. A fungus resistant gypsum-based substrate, comprising:
   a first polymeric fibrous nonwoven sheet, said first nonwoven sheet having a first surface and opposite first and second edges;
   a second polymeric fibrous nonwoven sheet, said second nonwoven sheet having a first surface and opposite first and second edges;
   a wet and hydrated gypsum core sandwiched between said first and second nonwoven sheets, said gypsum core containing less than 0.02% by weight, based on the weight of the wet gypsum core, of formulation additives that serve as fungus nutrients, and less than 0.33% by weight, based on the weight of the wet gypsum core, of naturally occurring contaminants which may serve as fungus nutrients;
   a synthetic adhesive on the first and second edges of said second nonwoven sheet, said synthetic adhesive adhering the first edge of said first nonwoven sheet to said first edge of said second nonwoven sheet, and adhering the second edge of said first nonwoven sheet to the second edge of said second nonwoven sheet; and
   wherein said first surface of said first nonwoven sheet and said first surface of said second nonwoven sheet adhere to said wet gypsum core with an adhesive strength of at least 7.5 lb.

7. The gypsum-based substrate of claim 6 wherein said first surface of said first nonwoven sheet and said first surface of said second nonwoven sheet have pores containing set gypsum of said gypsum core intertwined with the fibers in the first and second nonwoven sheets.

8. The gypsum-based substrate of claim 7 wherein said first surface of said first nonwoven is comprised of a web selected from the group of needle punched staple fiber sheets, hydroentangled fibrous sheets, and spunbond sheets.

9. The gypsum-based substrate of claim 6 wherein said first surface of said first nonwoven sheet and said first surface of said second nonwoven sheet are coated with a primer layer of a high density gypsum slurry having a density that is at least 1.1 times the density of the gypsum core.

10. The gypsum-based substrate of claim 6 wherein said first and second sheets adhere to said wet gypsum core with an adhesive strength of at least 10 lb.

11. A process for manufacturing a gypsum-based substrate, comprising the steps of:
   adding calcined gypsum, formulation additives and water to a mixer, said mixture containing less than 0.02% by weight, based on the weight of the total slurry mix, of formulation additives that serve as fungus nutrients;
   mixing the gypsum and water in the mixer to produce a gypsum slurry that is comprised of 50 to 65 weight percent gypsum;

providing a first polymeric fibrous sheet, said first sheet having a first surface and opposite first and second edges;

pouring said gypsum slurry from said mixer onto the first surface of said first sheet and spreading the gypsum slurry over said first surface of said first sheet;

providing a second polymeric fibrous sheet, said second sheet having a first surface and opposite first and second edges;

applying a synthetic adhesive on the first and second edges of said second sheet;

placing said first surface of said second sheet over the gypsum slurry that has been spread over the first surface of said first sheet;

adhering the adhesive on the first edge of said second sheet to said first edge of said first sheet, and adhering the adhesive on the second edge of said second sheet to said second edge of said first sheet;

enclosing the gypsum slurry between said first and second sheets to bring the slurry into intimate contact with said first and second sheets and form an elongated strip of gypsum slurry sandwiched between said first and second sheets;

allowing said elongated strip of gypsum slurry to set up and harden to form a stiff elongated strip having a solid, wet gypsum core sandwiched between said first and second sheets;

cutting said stiff elongated strip into gypsum board of desired length; and drying said gypsum board in a dryer to remove excess water from the gypsum boards.

12. The process of claim 11 wherein in the step of adding calcined gypsum, formulation additives and water to a mixer, said mixture contains less than 0.33% by weight, based on the weight of the total slurry, of fungus nutrients.

13. The process of claim 11 wherein after the elongated strip of gypsum slurry has set up and hardened to form a stiff elongated strip having a solid, wet gypsum core sandwiched between said first and second sheets, said first and second sheets adhere to said wet gypsum core with and adhesive strength of at least 7.5 lb.

14. The process of claim 11 wherein said first and second sheets are nonwoven sheets.

15. The process of claim 14 wherein said first surface of said first nonwoven sheet and said first surface of said second nonwoven sheet have open pores between fibers of sufficient size for the gypsum slurry to enter the pores and become intertwined with the fibers in the sheets when the gypsum slurry is enclosed between said first and second nonwoven sheets.

16. The process of claim 15 wherein said first and second sheets each have a mean flow pore size, measured according to ASTM F316-86, of at least 8.0 microns.

17. The process of claim 16 wherein said first and second sheet each have a mean flow pore size, measured according to ASTM F316-86, in the range of 8.7 to 40 microns.

18. The process of claim 15 wherein said first surface of said first nonwoven sheet and said first surface of and second nonwoven sheets are comprised of a web selected from the group of needle punched staple fiber sheets, hydroentangled fibrous sheets, and spunbond sheets.

19. The process of claim 12 wherein said first surface of said first sheet and said first surface of said second sheet are coated with a primer layer of a high density gypsum slurry having a density that is at least 1.1 times the density of the gypsum slurry.

20. The process of claim 14 wherein the dried gypsum board is comprised of less than 0.03% by weight, based on the weight of the gypsum core, of formulation additives that serve as fungus nutrients, and less than 0.5% by weight, based on the weight of the gypsum core, of fungus nutrients.

* * * * *